United States Patent [19]

Kornylak

[11] Patent Number: 4,981,210
[45] Date of Patent: Jan. 1, 1991

[54] RIGID SLAT ENDLESS CONVEYOR

[75] Inventor: Andrew T. Kornylak, Hamilton, Ohio

[73] Assignee: Kornylak Corporation, Hamilton, Ohio

[21] Appl. No.: 305,845

[22] Filed: Feb. 3, 1989

[51] Int. Cl.⁵ .............................................. B65G 39/20
[52] U.S. Cl. ................................... 198/845; 198/850
[58] Field of Search ............... 198/324, 334, 831, 853, 198/845, 850, 838, 792

[56] References Cited

U.S. PATENT DOCUMENTS

| | | |
|---|---|---|
| 145,771 | 12/1873 | Wheeler . |
| 853,129 | 5/1907 | Simpson . |
| 1,012,124 | 11/1911 | Conkling . |
| 1,377,450 | 5/1921 | Whipple . |
| 1,739,497 | 12/1929 | Beach . |
| 2,430,729 | 11/1947 | Kline et al. . |
| 2,541,632 | 2/1951 | Baugh . |
| 2,628,705 | 2/1953 | Kline et al. . |
| 3,082,861 | 3/1963 | Kornylak . |
| 3,680,927 | 8/1972 | Neureuther . |
| 3,876,061 | 4/1975 | Hammitt ..................... 198/850 X |
| 3,877,567 | 4/1975 | Sommerfield ................ 198/845 X |
| 4,016,971 | 4/1977 | Komossa et al. . |
| 4,351,637 | 9/1982 | Dixon . |

FOREIGN PATENT DOCUMENTS 2001261 9/1969 France ............................. 198/850

*Primary Examiner*—H. Grant Skaggs
*Assistant Examiner*—D. Glenn Dayoan
*Attorney, Agent, or Firm*—Fay, Sharpe, Beall, Fagan, Minnich & McKee

[57] ABSTRACT

An endless rigid slat conveyor is provided with pivotal connections between adjacent slats that are formed by pivotally interengaging arcuate surfaces with abutting planar surfaces between the connections and the flat surface of the formed belt. The connection has an arcuate outer surface facing inwardly of the closed loop belt to engage drive apertures in the sprockets and further to engage a cantilevered support surface of an adjacent belt. The cantilevered support surface has a roller, aligned with the adjacent connection that is supported on a stationary track, so that the connection is directly supported to a stationary track or rail. The rigid slats are constructed in one piece with identical cross sections throughout their axial extent, including reinforcing ribs.

19 Claims, 2 Drawing Sheets

4,981,210

RIGID SLAT ENDLESS CONVEYOR

BACKGROUND OF THE INVENTION

The present invention relates to rigid slat conveyors that are formed in a loop, for various industrial purposes. In this type of conveyor, rigidity is important as well as the related characteristic of a flat surface for a portion of the loop formed by adjacent slats. Connections between the adjacent slats must provide for this flatness, rigidity and other characteristics such as low friction, and considerable angular movement between adjacent slats, particularly as they move around supporting or driving sprockets.

SUMMARY OF THE INVENTION

An endless rigid slat conveyor is provided with pivotal connections between adjacent slats that are formed by pivotally interengaging arcuate surfaces with abutting planar surfaces between the connections and the flat surface of the formed belt. The connection has an arcuate outer surface facing inwardly of the closed loop belt to engage drive apertures in the sprockets and further to engage a cantilevered support surface of an adjacent belt. The cantilevered support surface has a roller, aligned with the adjacent connection that is supported on a stationary track, so that the connection is directly supported to a stationary track or rail. The rigid slats are constructed in one piece with identical cross sections throughout their axial extent, including reinforcing ribs.

The provision of an identical cross-section throughout the axial length of each slat provides for ease of manufacture and reduced cost, because the slats may be roll formed or extruded of material, such as metal, including aluminum and steel. The planar abutment surfaces are perpendicular to the top flat surface of the slats so that they can engage and provide for a tight joint. This joint is far stronger than adjacent acute angle edges, because the abutment surfaces are perpendicular to the flat surface of the top of the slats and thereby provide the greater strength for the adjacent edges. Also, one of these abutment surfaces will widen the connection surface of the adjacent slat during pivoting of slats from an acute angle to an aligned coextensive position and thereby keep the joint clean. The joint of the connection is otherwise a closed joint, which further contributes to its cleanliness and therefore reduced power of operation.

The support surface, inwardly of each connection with respect to the loop for one slat, engages a cantilevered support surface of the adjacent slat, which cantilevered support further engages a rigid track, preferably with a roller therebetween; thereby, any force directed to the joint inwardly with respect to the loop is transmitted through rigid structure directly perpendicular to the top planar surface of the slats all the way to a fixed base. In this manner, the connection is completely rigid, at least between the adjacent sprockets. Reinforcing ribs may be provided on the inner side, with respect to the loop, of the slats for rigidity between connections.

The connections may be such as to provide telescopic engagement for lost motion in the axial direction, so that guide vanes may shift adjacent slats axially to provide for a curved path of travel between adjacent slats.

BRIEF DESCRIPTION OF THE DRAWINGS

Further objects, features and advantages of the present invention will become more clear from the following detailed description of a preferred embodiment, shown in the drawing, wherein.

DETAILED DESCRIPTION OF THE PREFERRED EMBODIMENT

Figure 1:
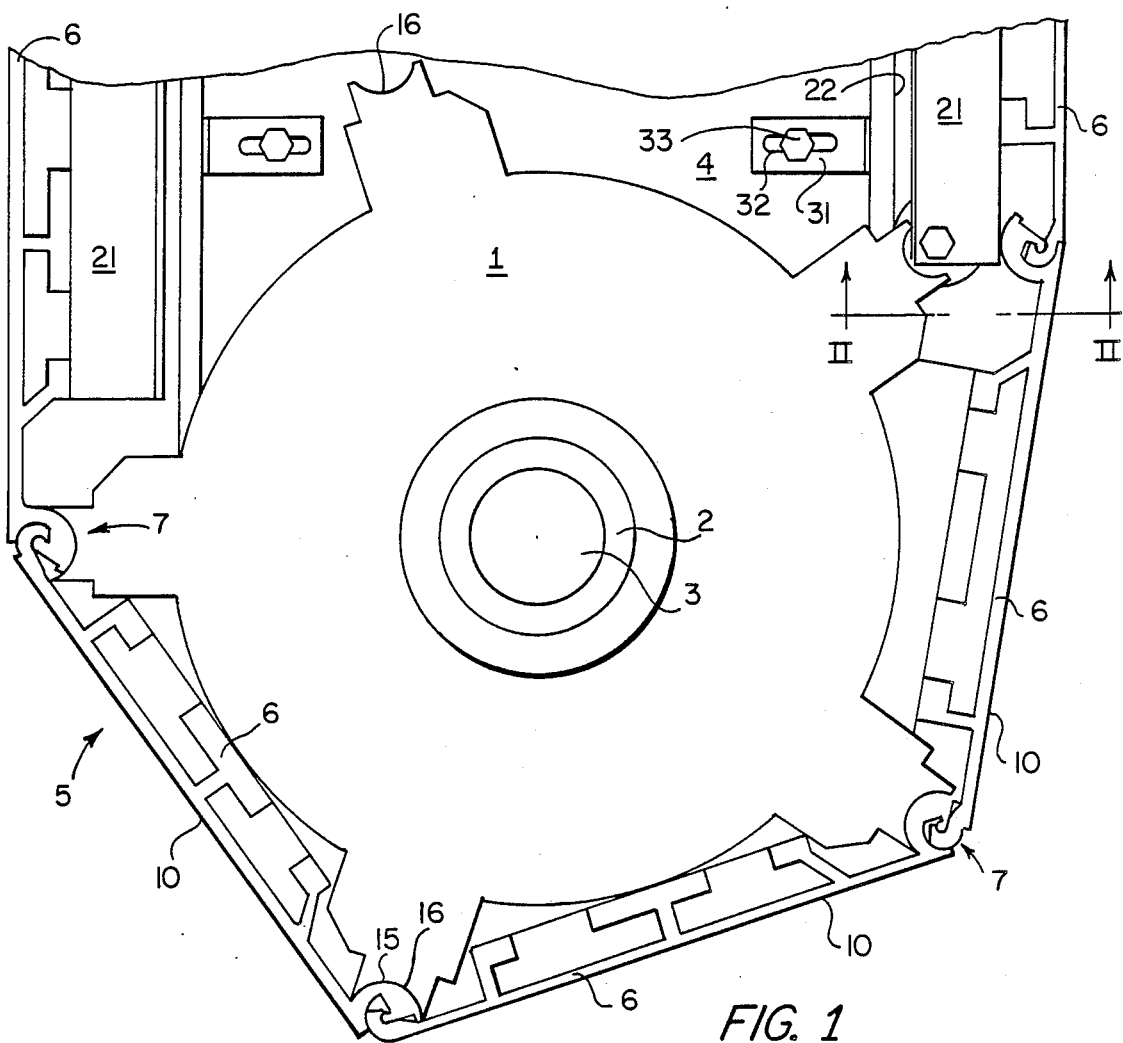
FIG. 1 is a front side view of a portion of the conveyor of the present invention, and is further a rear side view of the other end of the conveyor.

The conveyor of the present invention provides an endless support surface with a plurality of rigid slats connected along their adjacent edges in a closed loop. One-half of the closed loop is shown in FIG. 1 and the other half closed loop would generally be a mirror image of FIG. 1 and connected thereto. Such an endless conveyor composed of pivotally interconnected adjacent rigid flat slats is more clearly shown in the Kornylak U.S. Pat. No. 3,082,861 issued Mar. 26, 1963 and to Kline et al, U.S. Pat. No. 2,628,705 issued Feb. 17, 1953, whose disclosure is incorporated herein for the purposes of background conveyor structure and function of this type.

Figure 2:
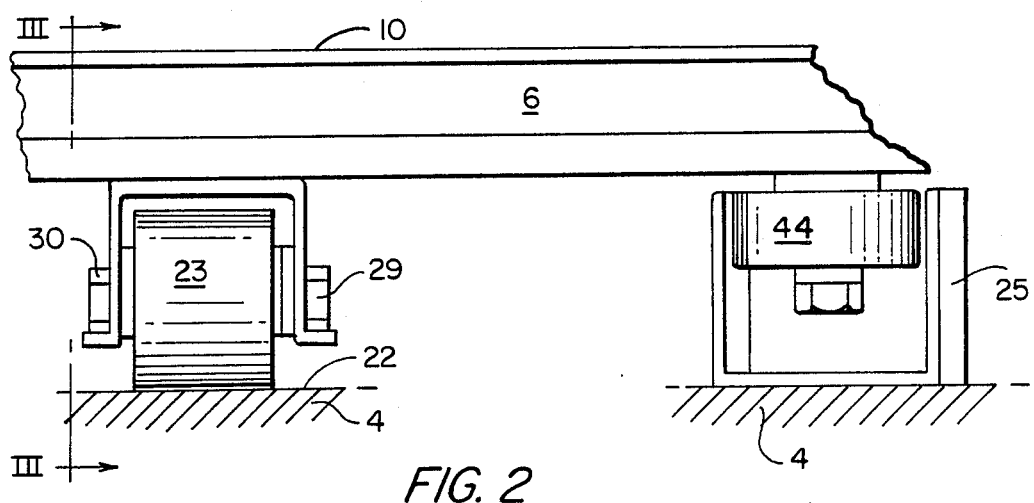
FIG. 2 is an enlarged partial view taken from line II—II in FIG. 1.

More specifically, FIG. 1 employs a sprocket 1 supported for rotation about its axis by a support bearing 2 on a fixed or rotating shaft 3 that is in turn supported on a base 4 (FIG. 2). The base 4 is a stationary rigid structure. As is conventional, a plurality, at least two, such sprockets 1 would be laterally spaced from each other for rotation about respective parallel axes.

The endless belt 5 travels in a closed loop, as is obvious from the above-cited U.S. patents and FIG. 1, through engagement around the sprockets 1, with the sprocket 1 shown in FIG. 1 as being inside of the loop. The endless belt 5 comprises a plurality of rigid slats 6 that are serially adjacent each other around a loop. A connection 7 interconnects adjacent edges 8, 9 of successive pairs of the slats 6 with a pivotal interconnection for rotation about respective axes that are parallel to the axis of rotation of the sprocket 1.

Figure 3:
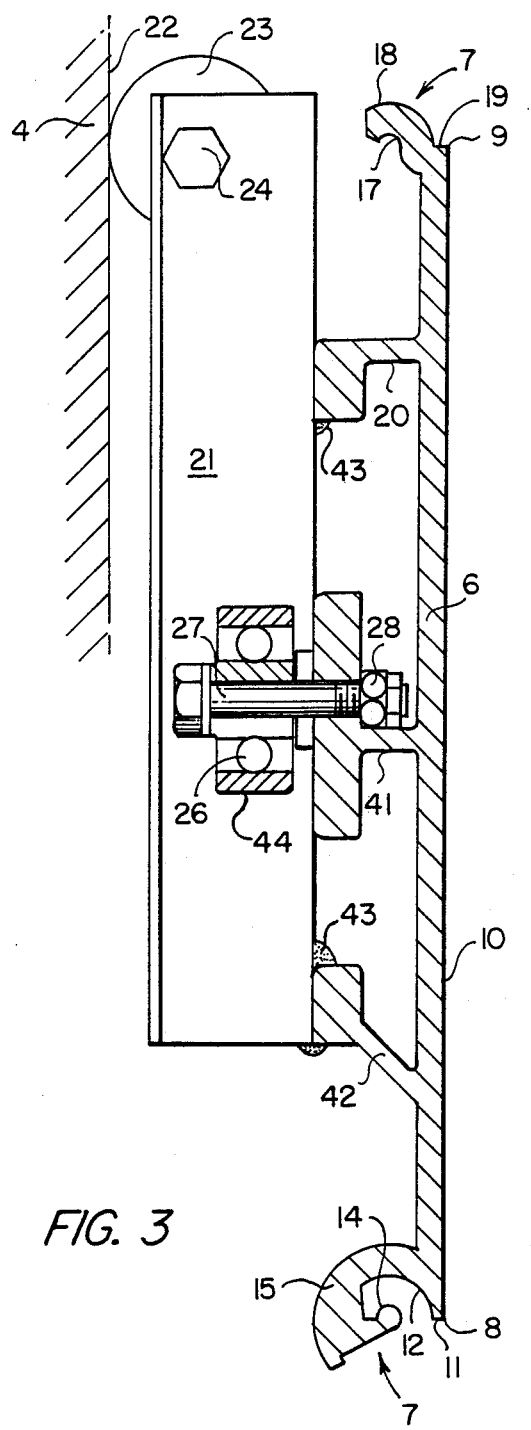
FIG. 3 is a cross-sectional view taken along line III—III of FIG. 2.

Each of the slats 6 has a top planar surface 10 that extends for its full axial length as partially seen in FIG. 2 and fully seen with respect to the above-mentioned U.S. patents. Further each of the slats top planar surface extends for the full length between its connections, as shown in FIG. 3. As seen in FIG. 3, a connection 7 is provided at one edge 8 and also at the other edge 9, of the adjacent edges of slats around the loop.

Figure 4:
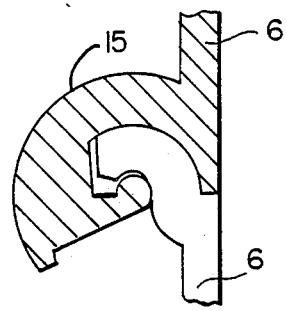
FIG. 4 is a cross-sectional view of a connection between adjacent slats in aligned coextensive positions.
Figure 5:
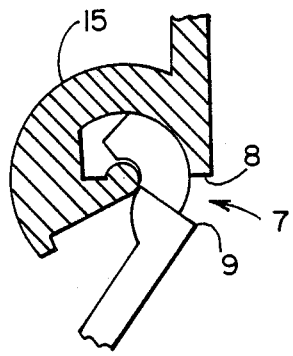
FIG. 5 is a cross-sectional view of the connection between adjacent slats in a partially pivoted position.
Figure 6:
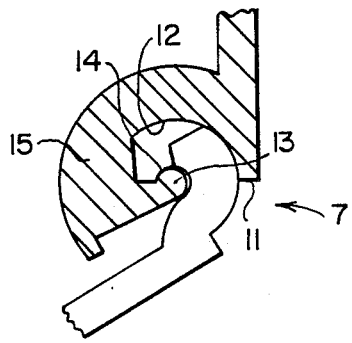
FIG. 6 is a cross-sectional view of the connection between adjacent slats in a greatly pivoted position.

As shown most clearly in FIGS. 4–6, the connection at the one edge 8 has an abutment surface 11 across its full axial extent that is generally planar and perpendicular to the planar top surface 10 of the slat. The straight edge, on the top, for the abutment surface 11 coincides with the edge 8 and joins with the planar top surface. The planar surface 11 joins an arcuate bearing surface 12 that is coaxial with and faces the axis 13 of the connection, as shown in FIG. 6. Since the entire slat is constructed homogenously in one piece with a common or identical cross sectional configuration throughout its axial extent, as shown in FIG. 3, the arcuate bearing surface 12 and the other surfaces of the connection correspondingly extend for the full axial extent of the slat. The connection further has a partial cylindrical shaft surface 14 spaced from, facing and concentric with the arcuate bearing surface 12. The shaft surface 14 is directly connected to the arcuate bearing surface 12 to form therebetween an arcuate shaped bearing aperture.

Integrally connected with the connection is a partially cylindrical support surface 15 that as concentric with the axis 13 of the connection. The support surface 15 faces inwardly with respect to the loop and faces away from the axis 13 of the connection. As shown in FIG. 1, the sprocket 1 is provided with a plurality of outwardly opening arcuate drive connection surfaces 16 that are equally spaced around the periphery, for example there are five such drive connection surfaces 16 shown for the sprocket 1. The drive connection surfaces 16 are coaxial with and engage the outer arcuate support surfaces 15 of the connection structure to thereby constitute the only drive connection between the sprocket and the belt. The sprocket may be driven to thereby drive the belt or the belt may be driven to thereby drive the sprocket.

The remainder of the connection is at the other, 9, of the adjacent edges of each slat, where there is formed a partially annular interior joint member having inner 17 and outer 18 arcuate surfaces generally concentric with and slidably engaging the arcuate bearing surface 12 and shaft surface 14, respectively, of the connection of the adjacent slat. At the edge 9, there is also formed an abutment surface 19 that engages the abutment surface 11 of the adjacent slat when they are in their aligned or coextensive positions. The abutment surface 19 is generally perpendicular to the planar top surface 10 and its outer edge corresponds to the edge 9 joining the planar top surface. The inner straight edge of the abutment surface 19 is parallel to the edge 9 and joins with a partially annular interior joint member having the surfaces 17 and 18.

To keep the joint clean, as shown in FIGS. 5 and 6, the abutment surface 11 will wipe the surface 18 on the adjacent slat free of debris as the slats pivot from an angularly related position such as that shown in FIG. 6 to a position such as shown in FIG. 5 or FIG. 4, with FIG. 4 showing a position wherein adjacent slats are aligned and coextensive with the abutment surfaces 11 and 19 contacting each other.

It is seen that the shaft surface 14 extends for approximately 270 degrees, the inner 17 and outer 18 surfaces of the partially annular interior joint member extend arcuately for approximately 180 degrees, and the inwardly facing arcuate bearing surface 12 adjacent the one edge 8 extends for slightly greater than the extent of surface 18 to allow edges 8 and 9 to engage.

As mentioned above, each of the slats is a homogenous one piece member including all of the above-mentioned connection structure, and in addition includes a plurality of ribs 20, 41, 42 extending parallel to the axis and interiorly of the loop. These ribs provide for reinforcement of the slats in their long axial direction. As shown in FIG. 3, a separate support member 21 is rigidly secured, for example by welding 43, to each of the slats, particularly to the inner, with respect to the inside of the loop, portion of the ribs 20 and 42, and optionally also the rib 41. As seen, the support member 21 is cantilevered beyond the rib 20 to extend to a position spaced inwardly, with respect to the inside of the loop, from the adjacent connection of its slat 6 at the end having the edge 9. From FIG. 1, it is seen that this cantilevered portion of the support member 21 engages the support surface 15 of the adjacent connection, at least in the area between the sprockets. As shown in FIG. 3, a stationary track 22 is provided parallel to the path of travel of the belt, at least between adjacent sprockets. This track provides for rigid support of the cantilevered support member 21, more particularly a support wheel 23 is rotatably mounted on the support member 21 about an axis 24 that is parallel to the axis 13 of the connection. The wheel 23 engages the stationary support track 22 at a position generally opposite each of the connections 7. More specifically, the engagement between the wheel 23 and the stationary track 22 provides one point in a common plane that also includes the axis 24 and the axis 13, which common plane is perpendicular to the plane of the planar flat surface 10 of the slat 6. Thereby, forces, particularly generated in use of the conveyor, that are applied at the connection or pivotal joint will be transmitted only through solid portions directly to the rigid track 22 of the base 4 along a line perpendicular to the flat surface of the slat 6. Specifically, a force applied to the edge 9 will be transmitted through the connection structure, support member 21, wheel 23 and track 22.

There is a provision for moving the slats 6 relative to each other in a position parallel to the axes so as to provide for a curved path between adjacent sprockets. As mentioned above, the slats have a common cross-sectional shape as seen in FIG. 3, so that the connection shown in FIGS. 4, 5, 6 provides telescopic sliding movement between adjacent slats parallel to the axis 13 of the connection 7. Each of the slats has one guide, particularly a wheel 44, extending away from the surface of the slat opposite from the planar top surface 10, that is toward the inside of the loop, as shown in FIG. 2. A track 25, specifically of a U-shape is provided in a curved path, that is has portions of the track extending at an angle with respect to the direction of travel of the slats in the loop. The track 25 is rigidly connected to the base 1. The wheel 44 has an axis of rotation that extends perpendicular to the planar top surface 10 of the slat 6. Thereby, the wheel 44 is guided within the channel 25, and when the channel 25 makes an angle with respect to the direction of travel of the loop, the slat 6 associated with that wheel 44 will be shifted laterally relative to its adjacent slat, for guiding the belt in a curved path in the axial direction in addition to the curved path in the peripheral direction provided by the sprockets 1. All of the rollers 44 are each mounted in an identical position with respect to its slat, and in general each of the slats has an identical structure, including support member 21 and guide roller 44.

As a specific means for mounting the roller 44, reference is made to FIG. 3, wherein it is seen that the roller 44 includes a roller bearing 26 mounted on a shaft 27 formed by a bolt provided with a nut 28 for securement to a flange of the rib 21. Similarly, the wheel 23 is mounted on a roller bearing, not shown, about a shaft formed by a bolt 29 having a nut 30. Suitable rotatable and lock washers are provided. The roller 23 is mounted on the support member 21. Support member 21 is formed from a U-shaped, preferably steel, member having out-turned flanges for rigidity.

As shown in FIG. 1, the track 22 is preferably a rail having an integral inwardly, with respect to the loop, depending mounting bracket 31 provided with an elongated slot 32 carrying therein a securement bolt 33 that can rigidly lock the track 22 in an adjusted position with respect to the base 4.

The operation of the conveyor has been described along with the structure that provides such operation. It is seen from the above that each of the slats may be rigidly constructed identically in a cheap and uniform manner, may be interconnected with a strong, clean and reliable joint that provides for rigid transfer of forces directly to the base as well as a driving connection with the sprocket. At the same time, the joint provides for relative axial movement between the slats.

While a preferred embodiment has been illustrated and described in detail as a preferred embodiment of the present invention, other embodiments, variations and changes are contemplated according to the broader aspects of the present invention, all as defined by the spirit and scope of the following claims.

I claim:

1. An endless support surface, comprising:
   a base;
   at least two generally parallel axis sprockets;
   support means for supporting said sprockets with respect to said base and laterally spaced from each other for rotation about their respective axes;
   an endless belt traveling in a closed loop and engaging around said sprockets, with said sprockets inside of said loop;
   said belt having a plurality of rigid slats serially adjacent each other;
   connection means interconnecting adjacent edges of successive pairs of said slats;
   said connection means pivotally interconnecting adjacent slats for rotation about an axis parallel to the axis of rotation of said sprockets;
   said slats each having a planar top surface for its full axial length and full length between connection means;
   said connection means, at one of said adjacent edges of each of said slats, having an abutment surface across its full axial extent that is generally planar and perpendicular to the planar top surface of said slat and having an outer straight edge for its full axial length that joins with the planar top surface, and an arcuate bearing surface coaxial with and facing the axis of said connection means and joining along the full axial length of said abutment surface; and
   said connection means having, at said one of said adjacent edges a partial cylindrical shaft surface spaced from, facing and concentric with said arcuate bearing surface, and rigidly directly connected to said arcuate bearing surface to provide therebetween an arcuate shaped bearing aperture.

2. An endless support surface according to claim 1, wherein said connection means at said one of said adjacent edges has a partial cylindrical support surface concentric with said connection means axis, inward of said loop and facing away from said axis of said connection means; and
   said sprockets having a plurality of outwardly opening arcuate drive connection surfaces equally spaced around the periphery;
   said drive connection surfaces being generally coaxial with and engaging said partial cylindrical support surfaces of said connection means to thereby constitute the only drive connection between said sprocket and said belt.

3. An endless support surface according to claim 1, wherein said connection means, on the other of said adjacent edges of said slat, has a partially annular interior joint member having inner and outer surfaces generally concentric with and slidably engaging said arcuate bearing surface and said shaft surface, respectively, of said connection means of the adjacent slat.

4. An endless support surface according to claim 3, wherein said connection means, on the other of said adjacent edges of each slat, having an abutment surface engaging the abutment surface of the adjacent aligned slat generally perpendicular to said planar top surface, with an outer straight edge joining said planar top surface, and inner straight edge parallel to said outer straight edge and joining said partially annular interior joint member.

5. An endless support surface according to claim 4, whereby said abutment surface inner edge of said one of said adjacent edges of said slat provides means wiping the surface of said partially annular interior joint member free of debris as said slats pivot from an angularly related position to a position wherein their support surfaces are aligned coextensive and said abutment surfaces are contacting.

6. An endless support surface according to claim 5, wherein said shaft surface extends for approximately 270 degrees, said inner and outer surfaces of said partially annular interior joint member extend arcuately in a space between said shaft surface and said outer surface, said inwardly facing arcuate bearing surface of said one of said adjacent edges extending for slightly greater than the extent of said outer surface.

7. An endless support surface according to claim 3, wherein said shaft surface extends for approximately 270 degrees, said inner and outer surfaces of said partially annular interior joint member extending arcuately in a space between said shaft surface and said outer surface, said inwardly facing arcuate bearing surface of said one of said adjacent edges extending for slightly greater than the extent of said outer surface.

8. An endless support surface according to claim 4, wherein said shaft surface extends for approximately 270 degrees, said inner and outer surfaces of said partially annular interior joint member extending arcuately in a space between said shaft surface and said outer surface, said inwardly facing arcuate bearing surface of said one of said adjacent edges extending for slightly greater than the extent of said outer surface.

9. An endless support surface according to claim 1, wherein each of said slats is a homogenous one-piece member including all of said connection means and a plurality of ribs extending parallel to said axes and interior of said loop.

10. An endless support surface according to claim 9, wherein each of said slats has an identical cross section at all cross sections taken perpendicular to said connection means axes throughout their entire axial length.

11. An endless support surface according to claim 1, wherein said connection means provides telescopic sliding movement between adjacent slats parallel to said axis of said connection means;

each of said slats having at least one guide means extending away from the surface opposite from said planar top surface; and a curved track, fixedly attached to said base and receiving therein said guide means for relatively shifting adjacent slats in the axial direction with a curved portion of said track for guiding said belt in a path curved in the axial direction in addition to the curved path in the peripheral direction provided by said sprockets.

12. An endless support surface according to claim 11, wherein said guide means is a roller mounted on an axis for rotation perpendicular to said connection means axes and perpendicular to said planar top surface;

all of said rollers being mounted in the same position on each of said slats; and said curved track being a curved U-shaped channel opening toward the adjacent slats.

13. An endless support surface according to claim 1, wherein said connection means at said one of said adjacent edges has a partial cylindrical support surface concentric with said connection means axis, inward of said loop and facing away from said axis of said connection means; and a support member rigidly secured to each of said slats and extending cantilevered to a position spaced inwardly of the loop from said connection means at the other of said adjacent edges and supportingly engaging said support surface of said connection means of the adjacent slat.

14. An endless support surface according to claim 13, further including at least one stationary track, parallel to the path of travel of the belt, and extending between at least two sprockets;

a support wheel rotatably mounted on said support member and engaging said stationary support track at a position adjacent each said connection means, and said support wheel having an axis of rotation parallel to the axis of said connection.

15. An endless support surface according to claim 14, wherein said wheel axis is spaced from said adjacent connection means axis and thereby defining a plane perpendicular to the plane of said planar top surface.

16. An endless support surface, comprising:
a base;
at least two generally parallel axis sprockets;
support means for supporting said sprockets with respect to said base and laterally spaced from each other for rotation about their respective axes;
an endless belt traveling in a closed loop and engaging around said sprockets, with said sprockets inside of said loop;
said belt having a plurality of rigid slats serially adjacent each other;
connection means interconnecting adjacent edges of successive pairs of said slats;
said connection means pivotally interconnecting adjacent slats for rotation about an axis parallel to the axis of rotation of said sprockets;
said connection means at said one of said adjacent edges has a partial cylindrical support surface concentric with said connection means axis, inward of said loop and facing away from said axis of said connection means; and
a support member rigidly secured to each of said slats and extending cantilevered to a position spaced inwardly of the loop from said connection means at the other of said adjacent edges and supportingly engaging said support surface of said connection means of the adjacent slat;
at least one stationary track, parallel to the path of travel of the belt, and extending between said at least two sprockets;
a support wheel rotatably mounted on said support member and engaging said stationary support track at a position adjacent each said connection means, and said support wheel having an axis of rotation parallel to the axis of said connection.

17. An endless support surface according to claim 16, wherein said wheel axis is spaced from said adjacent connection means axis and thereby defining a plane perpendicular to the plane of said planar top surface.

18. An endless support surface according to claim 17, wherein each of said slats is a homogenous one-piece member including all of said connection means, and a plurality of ribs extending parallel to said axes and interior of said loop;

each of said slats has an identical cross section at all cross sections taken perpendicular to said connection means axes throughout their entire axial length.

19. An endless support surface according to claim 18, wherein said connection means provides telescopic sliding movement between adjacent slats parallel to said axis of said connection means;

each of said slats having at least one guide means extending away from the surface opposite from said planar top surface;

a curved track, fixedly attached to said base and receiving therein said guide means for relatively shifting adjacent slats in the axial direction with a curved portion of said track for guiding said belt in a path curved in the axial direction in addition to the curved path in the peripheral direction provided by said sprockets;

said guide means is a roller mounted on an axis for rotation perpendicular to said connection means axes and perpendicular to said planar top surface;

all of said rollers being mounted in the same position on each of said slats; and said curved track being a curved U-shaped channel opening toward the adjacent slats.

* * * * *